Aug. 16, 1966     H. R. BUCY     3,266,254
HYDRAULIC CYLINDER AND PISTON SAFETY MEANS
Filed April 22, 1965     3 Sheets-Sheet 1
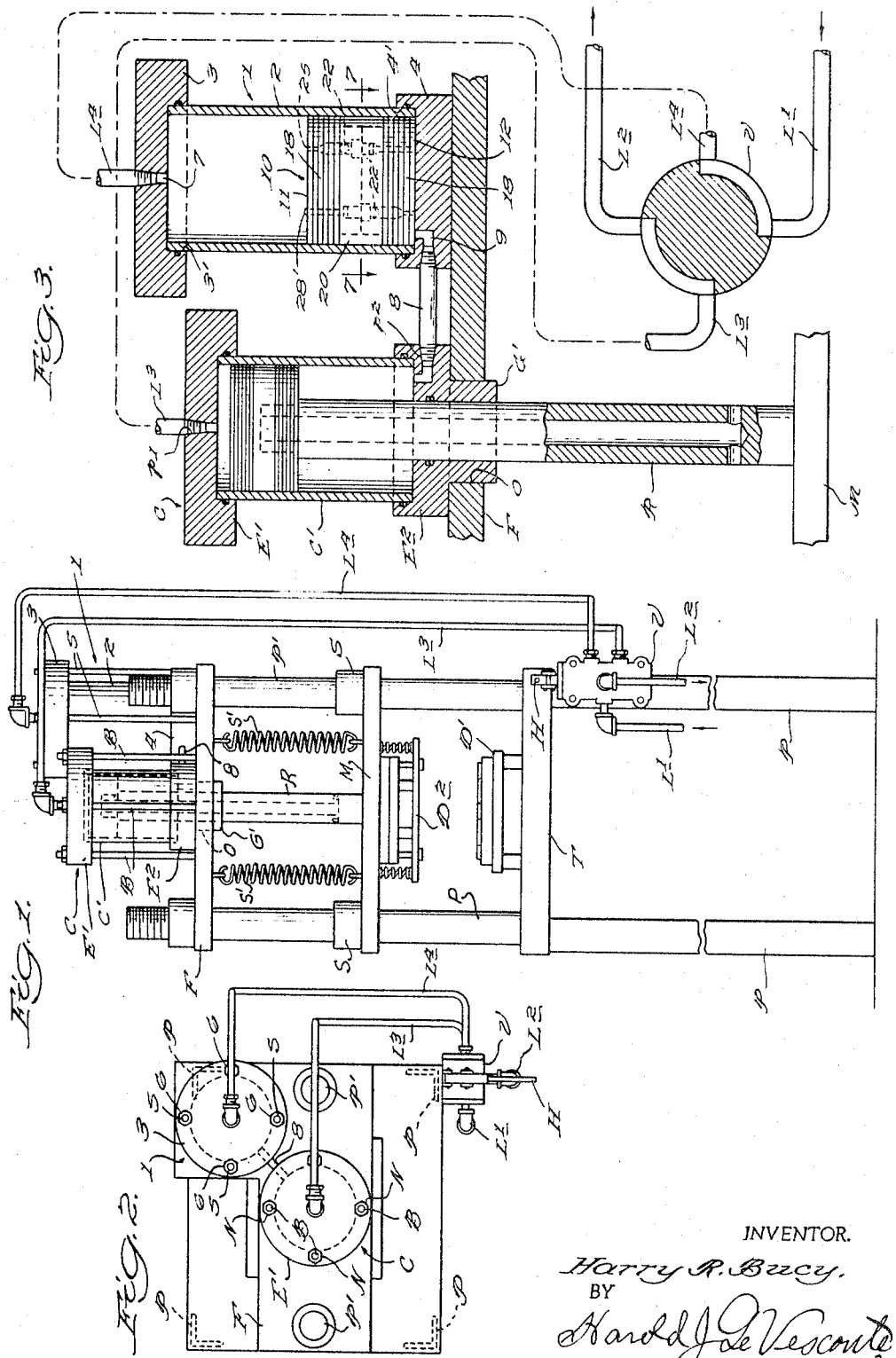
INVENTOR.
Harry R. Bucy.
BY
Harold J. LeVesconte
Atty.

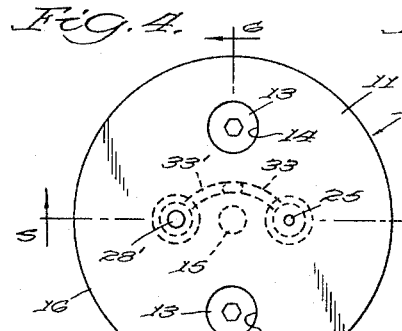
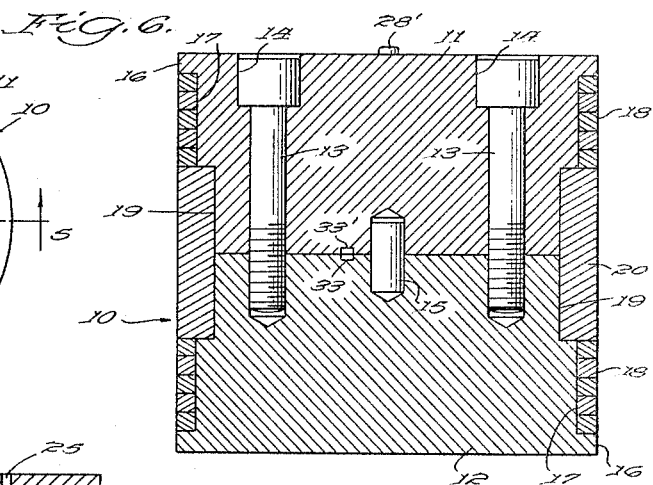
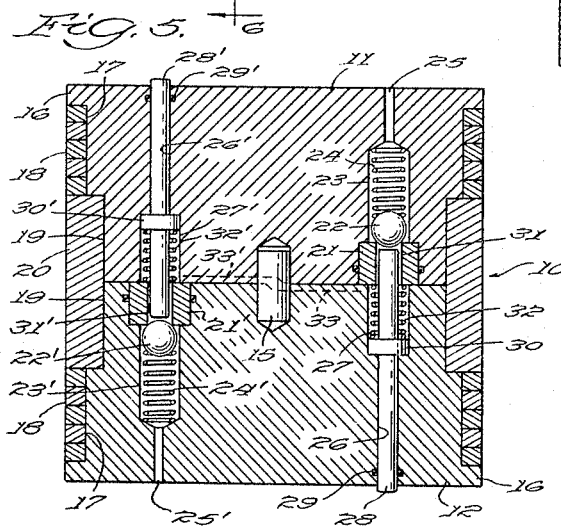

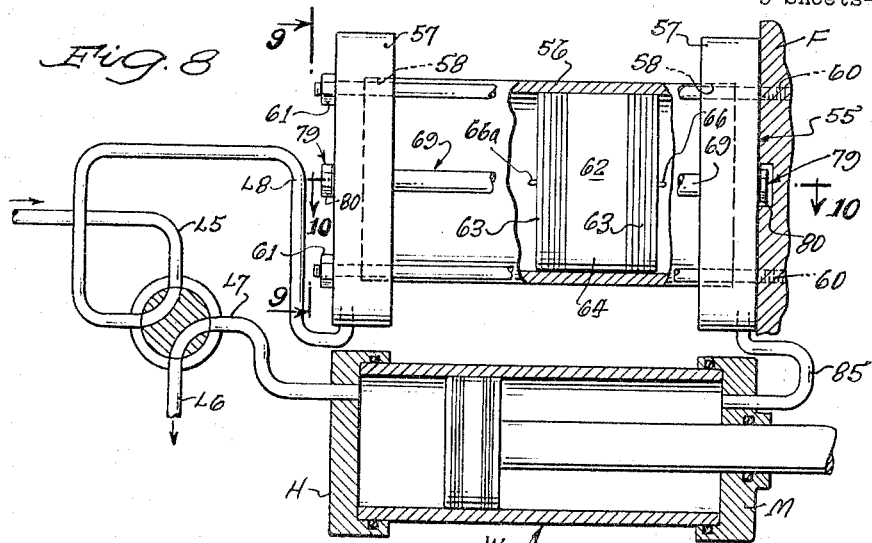
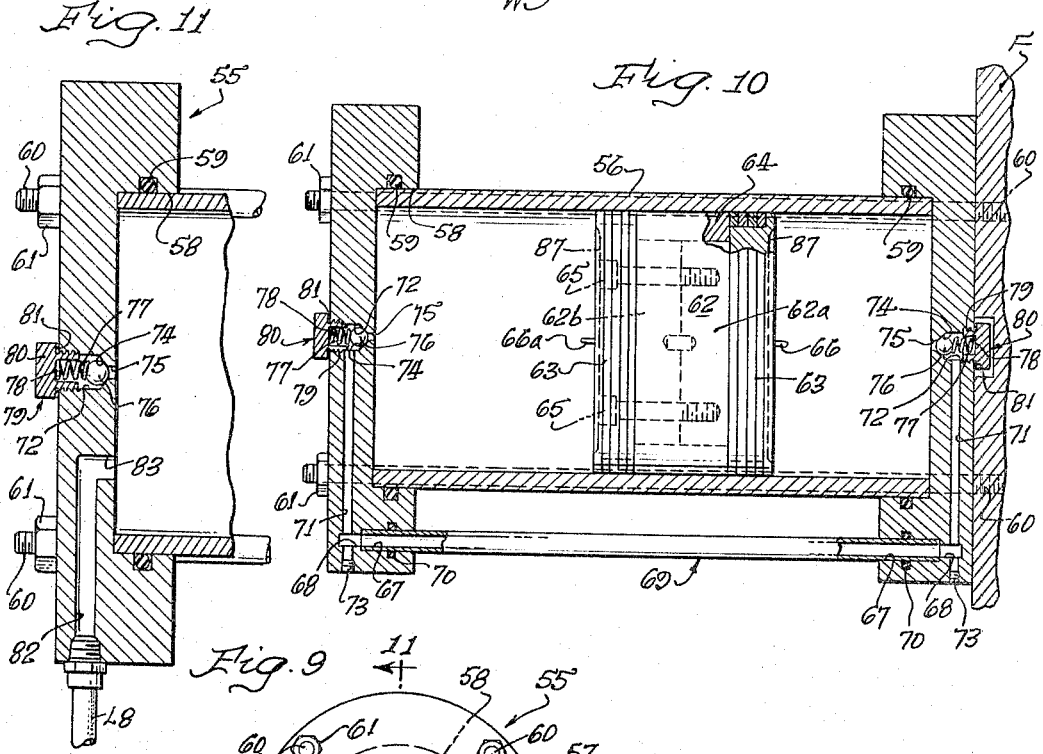
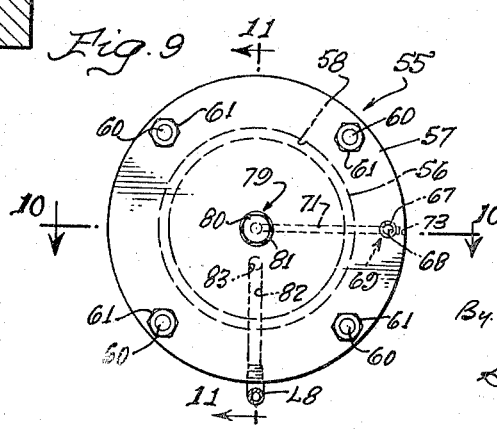

UNITED STATES PATENT OFFICE 3,266,254
Patented August 16, 1966

3,266,254
HYDRAULIC CYLINDER AND PISTON SAFETY MEANS
Harry R. Bucy, 625 S. Glenwood Place, Burbank, Calif.
Filed Apr. 22, 1965, Ser. No. 452,449
7 Claims. (Cl. 60—54.5)

This application is a continuation-in-part of my pending application Serial No. 164,851, filed January 8, 1962, and relates to fluid pressure actuated devices employing reciprocating piston and cylinder power means and is more particularly directed to auxiliary devices interposed in the pressure fluid conduit means effective automatically to render the power means incapable of inflicting injury to a machine operator in the event of malfunction of the power means within the cylinder component thereof, as, for example, the breakage of the piston rod or the separation of the piston from the piston rod.

The operation of hydraulic press types of machinery has always ben a hazardous occupation. Great forces are usually involved and in the event that an operating piston should break or become separated from its piston rod within the cylinder or if the piston rod itself should fracture within the cylinder during the retracting stroke when the dies or other device are being moved apart, the pressure that is being employed thus to effect that retracting stroke acts at once to project the piston rod outwardly causing the dies to close just at the time when the operator may be inserting or removing a workpiece. This often results in the loss of a hand or even of an arm.

With the foregoing considerations in mind, the principal object of the invention is to provide a safety means for fluid pressure actuated power cylinders effective in the event of breakage or detachment of a piston or breakage of the piston rod within the cylinder, to automatically limit the high flow rate or normal piston actuating rate of fluid flow to the side of the cylinder effecting movement of the piston thereof in the direction causing die separation to that which will only complete the movement of the piston and piston rod and the die means carried thereby in that direction and thus as will be explained, prevent unexpected and unwanted projection of the piston rod from the cylinder.

Another object of the present invention is to provide an auxiliary free piston device interposed between the fluid volume pressure source and the piston retracting side of the power means comprising a piston reciprocable in a cylinder effective, in the event of malfunction of the power cylinder, to prevent the fluid pressure from acting to move the piston in the direction of its working stroke.

Still another object of the invention is to provide a device of the above character including means for allowing the passage of low flow rate make-up fluid through the piston component of the device to compensate for leakage from the cylinder of the power means or leakage past the piston of the power means.

A still further object of the invention is to provide a device of the above character including means for allowing the passage of low flow rate make-up fluid around the piston component of the device to compensate for leakage from the cylinder of the power means or leakage past the piston of the power means.

A still further object of the invention is to provide a pilot operated valve in line between the cylinder control valve and the piston rod retracting end of the cylinder effective automatically to shut off fluid flow thereto at the expiration of a predetermined time interval after the said end of the cylinder has been subjected to operating pressure.

With the foregoing objects in view, together with such additional objects and advantages as may subsequently appear, the invention resides in the parts and in the construction, combination and arrangement of parts described, by way of example, in the following specification describing certain presently preferred embodiments of the invention, reference being had to the accompanying drawings which form a part of said specification, and in which drawings:

FIG. 1 is a side elevational view of a hydraulic press mechanism having one embodiment of the invention applied thereto, FIG. 2 is a top plan view of the press mechanism shown in FIG. 1, FIG. 3 is a semischematic view of the working and safety cylinders shown in medial section and the control valve, the fluid lines between the control valve and the cylinders being indicated in broken lines, FIG. 4 is an end elevational view of a representative piston for the safety cylinder shown in the preceding figures, FIGS. 5 and 6 are enlarged, medial, longitudinal sectional view taken, respectively, on the lines 5—5 and 6—6 of FIG. 4.

FIG. 7 is a reduced scale, transverse, sectional view taken on the lines 7—7 of FIG. 3, FIG. 8 is a semidiagrammatic view, partly in section, of a third embodiment of the invention involving means for by-passing make-up fluid around instead of through the free piston component of the device, FIG. 9 is an end elevational view, having reference to FIG. 8, of the left hand end of the free piston device shown in FIG. 8, FIG. 10 is an enlarged scale, medial sectional view taken on the line 10—10 of FIGS. 8 and 11, and FIG. 11 is a further enlarged, fragmentary sectional view taken on the line 11—11 of FIG. 9.

Referring first principally to FIGS. 1 and 2, the invention is shown as applied to a hydraulic press comprising four posts P supporting the corners of a bed plate or able T on which a lower die D1 and a pair of vertical posts P′ which at their upper ends are connected by a top frame member F carrying a vertical hydraulic cylinder and piston means C including a piston rod R depending therefrom to which a moving die plate M is attached for movement therewith; said plate being guided by guide sleeves S slidably engaging the posts P′ and said member carrying a die D2 which is complementary to the die D1.

On vertically reciprocable press devices it is necessary that a counterbalance means of a suitable form be employed. This counterbalance may be a spring means as shown or a weight and cable means or a weight and lever means as may best suit the press with which it is associated. In a press of the type depicted in FIG. 1, a tension spring means comprising a pair of tension springs S′, S′ extending between the upper frame member F and the moving platen M and having strength sufficient to resist the gravitational force of the combined piston rod, platen and die component D2 and, in the absence of opposing fluid pressure, being able to at least maintain the weight supported thereby at the upper end of the movement of the platen and its operating means.

A manually operated 4-way valve V is mounted on one of the posts P and connects with a line L1 affording connection with the source of pressure, a line L2 affording connection with a fluid reservoir, a line L3 connected to the upper end of the power cylinder means C and a line L4 connected to an auxiliary cylinder and piston means constituting an embodiment of the present invention and which will be described in detail. The valve V includes a handle H by which it is operated and is further provided with means, not shown, normally maintaining it in a position connecting the line L1 with line L4 and line L2 with line L3 thus causing pressure to maintain the dies separated. The cylinder means C may be of any desired construction and may, for example, comprise a cylindrical body C1 engaging recesses in top and bottom members E1 and E2, said members being clamped together by draw bolts B having one end thereof threaded into the top frame member F and thence extending through the member E1 and being secured by nuts N at the upper face of the end member E1; it being noted that the outer diameter of the member E2 is sufficiently smaller to allow the bolts B to extend outside the periphery of said lower member. Additionally, the top member E1 may have a port p1 to which the line L3 is connected and the end member E2 may have a piston rod guide G' which, externally, may engage an opening O in the top frame member F to secure the cylinder means against lateral movement.

Referring next to the foregoing figures and additionally to FIGS. 3 through 7, the first embodiment of the invention comprises an enclosed cylinder 1 disposed in close proximity to the cylinder C on the frame F; said cylinder 1 comprising a hollow cylindrical body 2 closed at its upper end by an end member 3 and at its lower end by an end member 4; said members having cylindrical recesses 3' and 4', respectively, into which the ends of the body 2 are received and the walls of said recesses being provided with peripheral grooves containing O-ring gaskets engaging the outer side of the body 2 to effect leakproof seals. As shown, the outer periphery of the end member 4 is of less diameter than the end member 3 to afford clearance for draw bolts 5 threadedly engaging the frame member F and thence extending through the member 3 for engagement by nuts 6 effective simultaneously to clamp the end members against the ends of the body 2 and to secure the cylinder 1 on the frame member F.

The line L4 connects with the interior of the cylinder 1 through a port 7 in the top end member 3 and a line or conduit 8 connects a port 9 in the member 4 with the port p2 in the member E2 thus providing a fluid passage between the lower ends of the two cylinders.

Freely reciprocable within the cylinder 1 is a piston assembly 10 and the diameter and length of the cylinder is such that the fluid displacement by movement of the piston 10 from one end to the other is not less than the fluid displacement of the cylinder C incident to movement of its piston from end to end thereof and preferably about ten per cent more in volume. The piston 10 is formed from two substantially identical halves 11 and 12 secured together in end to end relation by screws 13 extending through the half 11 and threadedly engaging complementary holes in the member 12; the heads of said screws being housed in counter bores 14 at the outer end of the member 11. The meeting faces of said halves are provided with axial bores which receive a dowel pin 15 effective to hold the halves axially aligned.

The peripheral side surfaces of each piston half include an end flange 16, a first reduced diameter portion 17 on which a series of gasket rings 18 are seated and a second reduced diameter portion 19 which mates with the corresponding portion of the other half and combines therewith to form a seat for a replaceable wear ring 20; the widths of said sets of gasket rings and said wear ring being such that clamping the two halves together by the screws 13 will secure all of said rings tightly together against endwise movement.

The inner end face of the piston half 11 is provided with a check valve means extending parallel to the axial line of the piston and including a valve seat member 21 seated in a counter bore in said end face and enclosing a ball check 22 within a valve chamber 23 which also houses a compression spring 24 yieldingly seating said ball on said seat. A passage 25 extends from the valve chamber 23 to the outer end face of the piston half. The piston half 12 is provided with a bore 26 axially aligned with the check valve means above described; said bore extending from the outer end face toward the inner end face thereof and terminating in a counter bore 27. Slidably mounted in the bore 26 is a plunger rod 28 which engages a sealing gasket 29 adjacent said outer end face. Intermediate its ends, the plunger rod 28 is provided with a collar 30 disposed at the bottom of the counter bore 27 and the plunger rod extends beyond the plane of the juncture of the piston halves and enters a hole 31 in the valve seat member 21. A compression spring 32 surrounding the portion of the rod within the counter bore 27 and reacting between the opposing faces of the collar 30 and the valve seat member 27 serves to yieldingly press the rod toward the outer end of the piston half 12. The rod 28 is of such length relative to the collar portion 30 that when the collar portion is seated in the bottom of the counter bore 28, the outer end of the rod will protrude slightly from the outer end face of the piston half 12 and the other end of the rod will be spaced from the ball 22 a lesser distance so that in the event that the piston 10 is seated against the bottom of the recess 4', the rod 28 will be caused to unseat the valve ball 22.

The piston halves 11 and 12 have an oppositely arranged but identical valve means effective in the event that the piston 10 is caused to be seated against the bottom of the recess 3' to unseat the corresponding valve. Since the parts are identical, they have been given the same numbers as the described counter parts with the addition of the exponent (').

The inner face of the piston half 12 is provided with a groove 33 which extends from the counter bore 27 thereof laterally to a point offset from the axial line of the piston 10 but in the plane containing the axial lines of the bolts 13, 13 as best shown in FIGS. 4 and 7. The inner face of the piston half 11 is similarly provided with a complementary groove 33' extending from the counter bore 27' thereof the end of which overlies the end of the groove 33 when the piston halves are assembled thus providing a continuous passage extending between the two counter bores 27 and 27'; it being noted that the ends of the rods 28 and 28' within the seat members 21 and 21' are considerably smaller than the openings 31 and 31' therein, whereby fluid may flow therethrough and pass the check ball 22 or 22' when one or other check ball is unseated.

When the press is to be given its working stroke, pressure fluid is delivered from the valve V through the line L3 to the upper end of the cylinder C forcing the piston thereof downwardly. The fluid beneath the piston of the working cylinder C will be expelled through the port p2 and conduit 8 and port 9 into the lower end of the safety cylinder 1 forcing the piston 10 thereof upwardly with incident expulsion of fluid contained above that piston through the line L4 to the valve V and thence through the line L2 to the reservoir. If the volume of fluid thus delivered to the safety cylinder 1 should be sufficient to move the piston 10 thereof into engagement with the bottom of the recess 3', the plunger rod 28' would be pressed into the piston 10 thus unseating the ball 22' and allowing fluid to enter the port 25' into the valve chamber 23' past the unseated check ball 22' and thence through the valve seat member 21' and along the channel formed by the groove 33' to the channel formed by the groove 33 into the counter bore 27 and thence through the opening in the valve seat member 21, unseating the ball 22 and thence out of the passage 25 thus completing the flow of fluid in limited amount through the system. When the working piston is given its retracting stroke, pressure fluid enters the safety cylinder 1 through the line L4 forcing the piston 10 downwardly which, in turn, forces fluid through the conduit 8 into the lower end of the working cylinder C moving the piston of the working cylinder to the upper end of its stroke. If the piston 10 bottoms out on the end member 4, the plunger 28 will displace the check ball 22 and limited fluid flow will go through the two check valve assemblies in the opposite direction.

As previously noted, the volume of the capacity of the cylinder 1 is greater than that of the working cylinder so that in the absence of leakage past the working cylinder piston or through the piston rod guide means of the working cylinder, the full stroke of the working cylinder will move the piston 10 toward one end or the other of the cylinder 1 without, however, bringing it into contact with the end of the cylinder toward which it happens to be moving. If, through wear or other causes, there should be leakage of either of the characters above described, and requiring a greater volume of fluid to be delivered to the working cylinder to effect the stroke of the piston, the piston 10 will come into contact with one or the other of the ends of the cylinder 1 with resultant opening of the one or the other of the valves 22 or 22' to allow make-up fluid or to dispel any excess fluid through the piston 10 and thus to permit the piston in the working cylinder to complete its stroke.

First, assuming a press mechanism not equipped with the device of the present invention, in the event of malfunction either by breakage of the piston rod or separation of the piston from the piston rod during a time when the piston is being moved in a direction retracting the piston rod into the cylinder, the effect of the then applied fluid pressure is first to move the piston itself (in case of separation) or with the attached portion of piston rod (in case of breakage) against the end of the cylinder toward which it was moving and then to project the piston rod out of the cylinder at a much faster rate by reason of the constant volume of pressure fluid and the smaller diameter of the piston rod which then acts as a piston.

By reason of the interposition of the safety cylinder between the line L4 and the working cylinder C, if this malfunction should occur at a time when the piston of the working cylinder were to be retracted or as shown in the drawings, moved upwardly, the piston 10, which then will be closely adjacent to the lower end of its stroke, will bottom against the end member 4 and the resulting displacement of the check valve 22 by the rod 28 will allow only a small trickle of fluid to flow through the piston 10 and thence into the working cylinder so that there is virtually no pressure in that cylinder as the hole through the piston rod permits it to escape to atmosphere at zero pressure. Normally, the function of these valves is to allow compensation for fluid leakage past the working cylinder piston so that at no time will there be any cavitation deriving from the interposition of this free piston device.

Incidentally, the working cylinder, its piston and particularly the piston rod shown in FIGS. 1, 3 and 8 embodies the warning means constituting the subject matter of my prior application Serial No. 148,162, filed October 27, 1961. It will be realized, however, that the safety device forming the subject matter of this application is not confined in its usefulness to the improved warning means shown in my said prior application but can be used on any hydraulic cylinder and piston power means whether vertical as shown or in any other attitude.

FIGS. 8 through 11 disclose a second modification of the invention generally like the first embodiment but differing in that it is arranged to cause make-up fluid to by-pass the free or safety piston component instead of going through it and differing also in that it is shown in a horizontal attitude, no force to gravity is required to be overcome by counterbalance means. Having reference first to FIG. 8, a working cylinder and piston assembly generally indicated at W includes a head end H and a mounting end M through which the piston rod reciprocates. A reversing valve is provided with a first port connected by a line L5 to a source of pressure, a second port connected to a line L6 extending to a fluid return reservoir, a third port connected by a line L7 to a port in the head end H of the working cylinder and a fourth port connected by a line L8 to one end member of the safety cylinder assembly 55 in a manner to be presently described. A fluid port in the mounting end M of the working cylinder is connected to the opposite end member of the safety cylinder assembly 55 by conduit means to be described. The reversing valve is, of course, operable to reverse the connections of the lines L5 and L6 to the ports to which the lines L7 and L8 are connected with resultant reversal of the direction of movement of the working cylinder piston and piston rod.

The safety cylinder assembly 55 comprises the cylinder body 56 and identical end members 57 which are of considerably greater diameter than the cylinder body and are each provided with a bore 58 in one side face thereof in which the opposite ends of the cylinder body 56 is received, the side walls of the bores 58 each having a peripheral groove housing a resilient O-ring gasket 59 engaging the outer periphery of the cylinder body end to afford a fluid tight seal. Radially outwardly of the cylinder, the end members are provided with aligned bores extending therethrough through which draw bolts 60 extend to hold the end members clamped to the ends of the cylinder body and simultaneously to mount the cylinder assembly on a mounting means F. As here shown, one end of each of the bolts 60 threadedly engages the mounting means F and the opposite ends of the bolts are threaded for engagement by nuts 61 which bear against the outer face of the opposite end member 57.

Mounted for free reciprocation in the cylinder body is the safety piston 62 preferably formed of two generally similar halves 62a and 62b and carrying opposite sets of packing rings 63, 63 and a centrally disposed metal wear ring 64, the halves being secured together by screws 65. The opposite end face of the piston in the axial line thereof carry axially outwardly extending valve opening pins 66 and 66a to which reference will be hereinafter made. Except for the elimination of the channels 33 and 33' and the associated valves and the addition of the valve operating pins 66 and 66a on the safety piston 62, in cross section is like that shown in FIGS. 5 and 6.

Radially outwardly of the cylinder body, the opposing end members 57 are provided with one each of a pair of tube receiving bores 67, 67 which thence continue in smaller bores 68, 68. Mounted in the bores 67, 67 are the opposite ends of a by-pass tube 69 sealed by O-rings 70, 70 disposed in grooves in the bores 67, 67. Each of the smaller bores 68 is intersected by a transverse bore 71 extending in a radial direction from the outer side face of the head member to the center thereof and communicates with an axially disposed valve chamber bore 72 extending inwardly from the end face of the member within the inner perimeter of the cylinder body. A plug screw 73 closes the outer end of the bore 71.

The inner end of the valve chamber bore 72 terminates in a frusto-conical valve seat portion 74 interposed between the valve chamber bore and the smaller inlet bore 75 which extends from the valve seat to the inner face of the end member but which is sufficiently large to allow the pin 66 or 66a at the adjacent side face of the piston 62 to enter and unseat the valve ball 76 which is normally held seated on the valve seat 74 by a compression spring 77 which reacts between said valve ball and an abutment at the end of a retaining bore 78 formed in the end of a screw plug 79 which engages the threaded outer end of the valve chamber bore and terminates in a head 80 engaging a gasket 81 interposed between said head and the outer end face of the end member.

Each of the end members 57 is additionally provided with a fluid port means here shown as a fluid port 82 extending radially inwardly from the periphery of the end member and thence communicating with a bore 83 extending outwardly from the inner face of the end member, and to insure constant fluid communication between the inlet bores 75 and the bores 83 at each end of the cylinder 55, the end faces of the piston are recessed as at 84. To complee the operating fluid circuit, a conduit 85 extends between the end of the safety cylinder opposite the end connected to line L8 and the end member M of the working cylinder W.

It is believed that the operation of this embodiment of the invention is obviously the same as of the first described form. The only difference is that in the event the free or safety piston should contact the end of the cylinder 55, the pin 66 or 66a thereof would then open the adjacent one of the valve balls 83 or 83' to allow the needed fluid to by-pass to the other side of the piston through tube 69 instead of going through the piston as shown in FIGS. 1 through 7. As in the preceding embodiments of the invention, in the event of a malfunction of the type against which the invention is intended to afford protection for the operator, the movement of the piston to the right hand end of the cylinder 55 serves to limit fluid flow to the piston rod end of the working cylinder to an amount that is incapable of causing harmful unanticipated projection of the piston rod and a die half carried thereby, serving thus to protect the press operator.

It will be understood the last disclosed form of the invention is shown in a horizontal attitude not requiring counterbalance means, the previously disclosed forms may also be employed with horizontally disposed working cylinders and it will also be appreciated that there is no necessity that the safety cylinder and its free piston be disposed in close parallel proximity to the working cylinder with which it is associated and may be spaced therefrom and positioned in a non-parallel attitude with respect to the associated working cylinder. Further, it will be apparent that, if desired, the piston and piston rod may be stationary and the cylinder component constitute the moving element of the motor means.

While in the foregoing specification there has been disclosed certain presently preferred embodiments of the invention, such disclosure has been by way of examples, wherefore, it will be understood that the invention is not to be deemed to be limited to the exact details of construction thus disclosed and that the invention includes as well, all such changes and modifications in the parts and in construction, combination and arrangement of parts as shall come within the purview of the appended claims.

I claim:

1. A safety means for use with a hydraulic motor means of the type comprising a hydraulically operated cylinder and piston and a fluid supply and return system including valve means operable to effect the imposition of hydraulic pressure on the desired face of the piston within the cylinder with resultant relative axial movement between the piston and cylinder and in which the piston is connected to and operates a piston rod guided in one end of the cylinder; said safety means comprising a hydraulic flow and pressure responsive instrumentality interposed in that portion of the system extending between the system valve means and that end of the cylinder in which the piston rod is guided, said instrumentality comprises an enclosed cylinder having a freely reciprocable piston element therein effecting fluid tight engagement with the wall surface of said enclosed cylinder, in which one end of the interior of said cylinder at one side of said freely reciprocable piston is connected to a hydraulic fluid flow to and from the system valve means, in which the interior of said cylinder at the other side of said freely reciprocable piston is connected for hydraulic fluid flow to and from the piston rod guiding end of the cylinder of said motor means, and in which said enclosed cylinder and piston include normally closed valve means and fluid conduit means associated therewith, said normally closed valve means being positioned to be opened by engagement with said freely reciprocable piston incident to the approach thereof into juxtaposition with an end of said enclosed cylinder with resultant opening of a passage for fluid flow from the end of said enclosed cylinder at which said normally open valve means has been opened by said freely reciprocable piston to the end of said cylinder at the opposite side of said freely reciprocable piston.

2. A safety means as claimed in claim 1 in which said normally closed valve means and the fluid conduit means associated therewith are carried by and extend through said freely reciprocable piston.

3. A safety means as claimed in claim 1 in which said normally closed valve means is disposed in and is carried by means forming the opposite ends of said enclosed cylinder and is arranged to control fluid flow between the portions of said cylinder which are separated by said freely reciprocable piston through conduit means extending between said separated portions of said enclosed cylinder and is disposed, at least in part, externally of said enclosed cylinder.

4. A safety means for use with a hydraulic cylinder and piston motor means in which a piston rod carried by the piston is caused to be extended out of or retracted into the cylinder in response to the application of hydraulic fluid under pressure to one side or the other of the piston of said motor means; said safety means comprising a hydraulic fluid flow controlling device interposed between a source of fluid pressure and that side only of the motor means which, in response to the entry of hydraulic fluid under pressure thereto through said fluid flow controlling device, effects relative movement between the cylinder and piston causing the piston rod to be retracted into the cylinder; said fluid flow controlling device comprising a cylinder closed at both ends, a first port at one end of the cylinder connecting the interior of that end of the cylinder with the system valve means, a second port at the opposite end of said cylinder connected by conduit means to the interior of the piston rod retracting side of said motor means, a freely reciprocable piston wholly enclosed within said cylinder and reciprocable from end to end thereof, said freely reciprocable piston dividing said cylinder into separate hydraulic fluid containing portions, in which said safety means includes conduit means affording communication between said portions of said cylinder and normally closed valves in said conduit means, and in which cooperating means between said piston and the ends of said cylinder are effective, upon close proximity of said freely reciprocable piston to either end of said enclosed cylinder to open the adjacent normally closed valve means to permit fluid flow from the interior of said end of said cylinder which is closely adjacent to the piston to the interior of the cylinder at the opposite side of said piston in a volume and at a rate insufficient to effect potentially harmful, unanticipated projection of a separated piston rod from the motor means cylinder.

5. In a hydraulic cylinder and piston power means, an enclosed cylinder, a piston reciprocable in said cylinder and carrying a piston rod reciprocable in guide means carried by one end of said cylinder, a port at the end of said cylinder remote from said guide means, a second port at the end of said cylinder adjacent said guide means, fluid conduit means including manually operable valve means for supplying hydraulic fluid under pressure to one or the other of said ports with resultant movement of said piston and piston rod in the desired direction, and safety means interposed in the hydraulic fluid conduit means between said valve means and said second port of said cylinder comprising a hydraulic fluid volume controlling device including a hollow body having one port connected by fluid conduit means to said valve means, a second port connected to said second port of said cylinder, and means movable within said body automatically operable, in the event of separation of the piston from the piston rod within the cylinder or fracture of the piston rod within the cylinder and resultant increase in the fluid volume capacity of that side of the cylinder, to limit the volume of fluid flow thereto to an amount which, at the normal operating flow rate of the fluid, is insufficient to effect a rate of the resultant movement of the separated piston rod to the outward limit of movement of said piston rod which is not potentially harmful to an operator; said hollow body of said safety means comprising a cylinder closed at both ends, said one port being disposed at one end of said cylinder, said second port being disposed at the other end of said cylinder and affording fluid conducting communication with the piston rod retracting side of said power means; said safety means further including a piston element wholly enclosed within said cylinder and freely reciprocable from end to end therein; the volume of fluid displacement incident of traverse to said piston from end to end of said cylinder being not less than the volume of fluid required to effect complete retraction of the piston rod of the power means; said freely reciprocable piston including normally closed valve means and operating devices therefor effective to permit fluid flow from one end of said last named cylinder to the opposite end thereof only when said freely reciprocable piston is at an end of its travel in the said cylinder and only therethrough in the direction toward the end of the cylinder which is adjacent to said freely reciprocable piston.

6. A safety means as claimed in claim 5 in which said normally closed valve means is disposed in said freely reciprocable piston and is opened by means on the end of the cylinder engaging said valve means.

7. A safety means as claimed in claim 5 in which said normally closed valve means is disposed at and is carried by means constituting the ends of said enclosed cylinder and is opened by engagement with a member carried by said freely reciprocable piston.

References Cited by the Examiner
UNITED STATES PATENTS

| | | | |
|---|---|---|---|
| 706,688 | 8/1902 | Reynders et al. | 60—51 X |
| 2,192,909 | 3/1940 | Hoffar | 60—54.5 X |

EDGAR W. GEOGHEGAN, *Primary Examiner.*

ROBERT R. BUNEVICH, *Examiner.*